United States Patent
Voogel et al.

(10) Patent No.: US 10,726,181 B1
(45) Date of Patent: Jul. 28, 2020

(54) REGULARITY OF FABRICS IN PROGRAMMABLE LOGIC DEVICES

(71) Applicant: XILINX, INC., San Jose, CA (US)

(72) Inventors: Martin L. Voogel, Niwot, CO (US);
Trevor J. Bauer, Boulder, CO (US);
Henri Fraisse, Sunnyvale, CA (US)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 16/502,137

(22) Filed: Jul. 3, 2019

(51) Int. Cl.
*G06F 30/394* (2020.01)
*G06F 30/331* (2020.01)
*G06F 30/392* (2020.01)

(52) U.S. Cl.
CPC .......... *G06F 30/331* (2020.01); *G06F 30/392* (2020.01); *G06F 30/394* (2020.01)

(58) Field of Classification Search
CPC .. G06F 17/50; G06F 17/5027; G06F 17/0545; G06F 17/5054; H03K 19/0175; H03K 19/017581; H03K 19/177; H03K 19/17704
USPC ................................................ 326/37–41, 47
See application file for complete search history.

(56) References Cited

U.S. PATENT DOCUMENTS

| | | | | |
|---|---|---|---|---|
| 7,535,254 | B1* | 5/2009 | Case ................ | H03K 19/17732 326/39 |
| 2007/0057693 | A1* | 3/2007 | Reblewski .......... | G06F 11/2236 326/41 |
| 2007/0247189 | A1* | 10/2007 | Phil .................. | H03K 19/17728 326/41 |
| 2010/0095147 | A1* | 4/2010 | Reblewski ............ | G06F 11/261 714/3 |
| 2012/0256653 | A1* | 10/2012 | Cordero .......... | H03K 19/17796 326/16 |
| 2014/0122835 | A1* | 5/2014 | Mykland ............... | G06F 30/394 712/32 |

* cited by examiner

*Primary Examiner* — Jason Crawford
(74) *Attorney, Agent, or Firm* — Patterson + Sheridan, LLP (57) ABSTRACT

A programmable logic device with fabric regularity is disclosed. For example, the programmable logic device may include a plurality of similar heterogeneous logic blocks. A user's design may be implemented within a first group of heterogeneous logic blocks. The user's design may be moved or copied to a second group of heterogeneous logic blocks. More specifically, routing, timing, and/or placement information associated with the implementation of the users design in the first group of heterogeneous logic blocks may be used to implement the user's design in the second group of heterogeneous logic blocks.

35 Claims, 6 Drawing Sheets

REGULARITY OF FABRICS IN PROGRAMMABLE LOGIC DEVICES

TECHNICAL FIELD

Aspects of the present disclosure generally relate to programmable logic devices, and specifically to regularity of fabrics within programmable logic devices.

BACKGROUND

Programmable logic devices (PLDs) are well-known general-purpose devices that may be programmed by a user to implement a variety of selected functions. One example of a PLD is a field programmable gate array (FPGA). An FPGA may include an array of configurable logic blocks, a plurality of input/output blocks, and block RAM elements selectively connected to each other by a programmable interconnect structure.

A user may capture a PLD design with one or more software design tools. The software design tools allow the user to specify desired functions and/or behaviors of the PLD. The user's design may target or specify one or more specific logic blocks within the PLD to implement the desired functions and/or behaviors. Additionally, the software design tools may simulate, place, and route the user's design, and generate an associated configuration file. The configuration file may be a bitwise representation of the user's design that may be used to program configurable elements within the PLD when the PLD is powered on.

In some instances, a user's PLD design may include a design core. A design core may implement, for example, a particular function or feature that may encompass several logic blocks, input/output blocks, RAM elements, and the like of the PLD. Design cores, and more particularly large and complex design cores, may require substantial design time to describe and implement through the software design tools. For example, it may take hours or days to input, simulate (e.g., verify timing and/or operating frequency), place and route a particular design core.

In some instances, the user may wish to "relocate" the design core, Relocating the design core may include changing the location of the design core within the PLD or, in some cases, moving the design core to a different PLD altogether. Traditional approaches may require the user to re-run the software design tool to specify the new design core location, simulate, place, and route the updated design. Re-running the design tool may negatively increase design time, especially when the design core is large and/or complex. Therefore, there is a need for a more efficient process to relocate all or part of a design within a PLD while providing predictable timing and/or maximum operating frequency.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are directed to configuration data reuse with respect to programmable logic devices. A programmable logic device may include a plurality of nearly-identical heterogeneous logic blocks. Configuration data for a design implemented within a first heterogeneous logic block may be reused to implement the design within a second heterogeneous logic block. An example programmable logic device may include a plurality of heterogeneous logic blocks, each heterogeneous logic block including an identical configuration of digital signal processing blocks, programmable logic blocks, and a platform management controller coupled to each heterogeneous logic block. The platform management controller may be configured to implement a design core in the first heterogeneous logic block. The platform management controller also may implement the design core in the second heterogeneous logic block and receive a first bitstream to configure the first heterogeneous logic block and the second heterogeneous logic block. The system also may include a processing device configured to generate the bitstream.

An example system is disclosed that may include a programmable logic device comprising a plurality of heterogeneous logic blocks, each heterogeneous logic block including an identical configuration of digital signal processing blocks, programmable logic blocks, and a platform management controller coupled to each heterogeneous logic block. The platform management controller may be configured to implement a design core in the first heterogeneous logic block. Further, the platform management controller may implement the design core in the second heterogeneous logic block and also may include a processing device configured to generate the first bitstream and the second bitstream.

An example method disclosed herein may be used to generate bitstreams for programmable logic devices. The method may include generating a first bitstream comprising a first configuration data to implement a first design in a first heterogeneous logic block of a programmable logic device. The first bitstream may include a first identifier to associate the first configuration data with the first heterogeneous logic block. The method may include generating a second bitstream comprising the first configuration data to implement the first design in a second heterogeneous logic block of the programmable logic device. The second bitstream may include a second identifier to associate the first configuration data with the first heterogeneous logic block.

BRIEF DESCRIPTION OF THE DRAWINGS

The example embodiments are illustrated by way of example and are not intended to be limited by the figures of the accompanying drawings. Like numbers reference like elements throughout the drawings and specification.

DETAILED DESCRIPTION

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example embodiments are not to be construed as limited to specific examples described herein but rather to include within their scope all embodiments defined by the appended claims.

The relocation and/or reuse of some or all of a design of a programmable logic device may be costly in terms of design time. For example, a user may re-execute a software design tool to relocate the user's design, compile, place, route, and generate new configuration data. The re-execution of the software design tool may need minutes, hours, or in some cases days to complete based on the size and/or complexity of the user's design.

Aspects of the present disclosure may reduce the design time associated with relocating and/or reusing an existing design by implementing the programmable logic device using a plurality of heterogeneous logic blocks. In one embodiment, a heterogeneous logic block may include a plurality of logic elements including programmable logic, RAM, and one or more specialized computational blocks such as, for example, a digital signal processing block. The contents and arrangement of each heterogeneous logic block may be substantially similar to one another. In this manner, a design that may be implemented within one of the heterogeneous logic blocks may easily be moved or replicated in any other heterogeneous logic block. In some implementations, a design that spans two or more heterogeneous logic blocks may also be relocated and/or copied to another two or more heterogeneous logic blocks.

Figure 1:
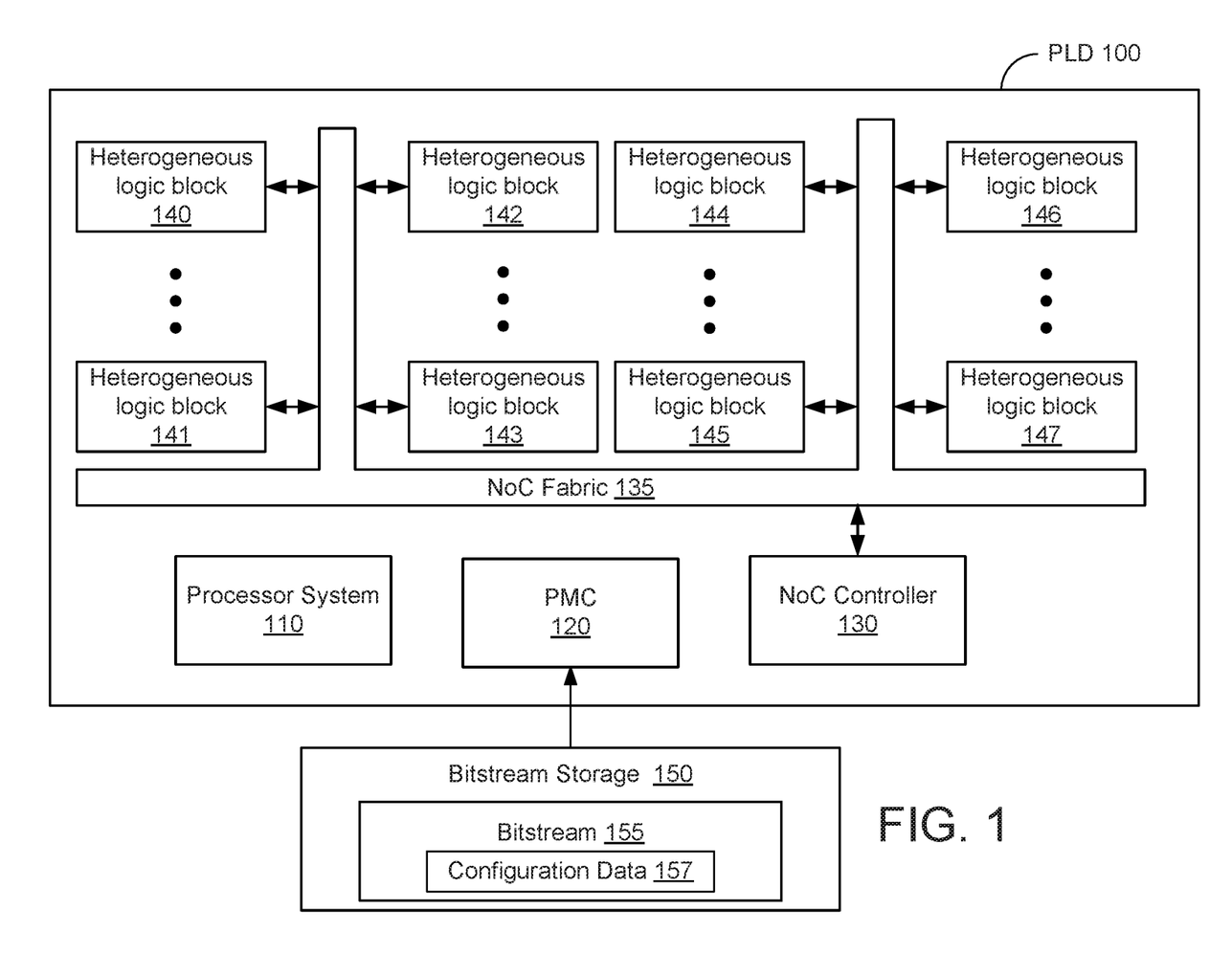
FIG. 1 shows a block diagram of an example programmable logic device.

FIG. 1 shows a block diagram of an example programmable logic device (PLD) 100. The PLD 100 may include a processor system 110, a platform management controller (PMC) 120, a network-on-chip (NoC) controller 130, a NoC communication fabric 135, and a number of heterogeneous logic blocks 140-147. In some implementations, the PLD 100 may include fewer, more, or different logic elements or logic blocks than those depicted in the example of FIG. 1. Some logic blocks or elements may not be shown for simplicity. For example, the PLD 100 may include input/output blocks, clock distribution blocks and/or other logic blocks.

The processor system 110 may include one or more processing units and/or processors for use within the PLD 100. In some implementations, the processor system 110 may include one or more processing cores, including ARM cores, as well as associated memory, cache memory, processor core interfaces, and the like. The PMC 120 may include one or more logic blocks or circuit elements associated with platform management operations. In some implementations, the PMC 120 may include power management logic, one or more bus interfaces including JTAG, I2C, SE, eMMC, and other technically feasible bus interfaces. In addition, the PMC 120 may include an interface to receive configuration data within a bitstream. The configuration data may be used to configure the PLD's configurable logic elements to implement a user's design. The bitstream may include the configuration data and other PLD specific information. In some implementations, the PMC 120 may be coupled to a bitstream storage device 150. The bitstream storage device 150 may include a bitstream 155 that in turn includes configuration data 157. In some implementations, the bitstream storage device 150 may be a nonvolatile memory with sufficient capacity to store the bitstream 155, In other implementations, the bitstream storage device 150 may be a processing device configured to provide the bitstream 155 to the PLD 100. Furthermore, the PMC 120 may be coupled to one or more logic blocks and/or elements within the PLD 100 via a configuration bus (not shown for simplicity) to configure the logic blocks and elements as described in the bitstream 155.

The NoC controller 130 may be coupled to the NoC fabric 135, The NoC controller 130 and the NoC fabric 135 together may form an addressable, packetized, data communication system that enables data transfer between one or more logic blocks and/or elements within the PLD 100. In some implementations, the NoC controller 130 and/or the NoC fabric 135 may include programmable switches, programmable circuitry, and/or configuration registers (not shown for simplicity) to enable dynamic addressing and routing of data within the PLD 100.

FIG. 1 depicts the PLD 100 including heterogeneous logic blocks 140-147. The PLD 100 may include any technically feasible number of heterogeneous logic blocks. Each of the heterogeneous logic blocks 140-147 may be coupled to the NoC fabric 135 through a NoC interface (not shown for simplicity). As described below in more detail in conjunction with FIG. 2, the heterogeneous logic blocks 140-147 may include a plurality of functional and/or logic blocks in a similar, identical, or near-identical configuration. The depiction of the heterogeneous logic blocks 140-147 in FIG. 1 is merely a logical representation and not meant to imply or restrict any implementation of internal physical placement of circuits, devices or the like. Thus, designs that are implemented within a heterogeneous logic block may be easily relocated to any other heterogeneous logic block due to their identical or similar configuration. Furthermore, the NoC fabric 135 may provide access to data needed to implement a design with any heterogeneous logic block 140-147.

Figure 2:
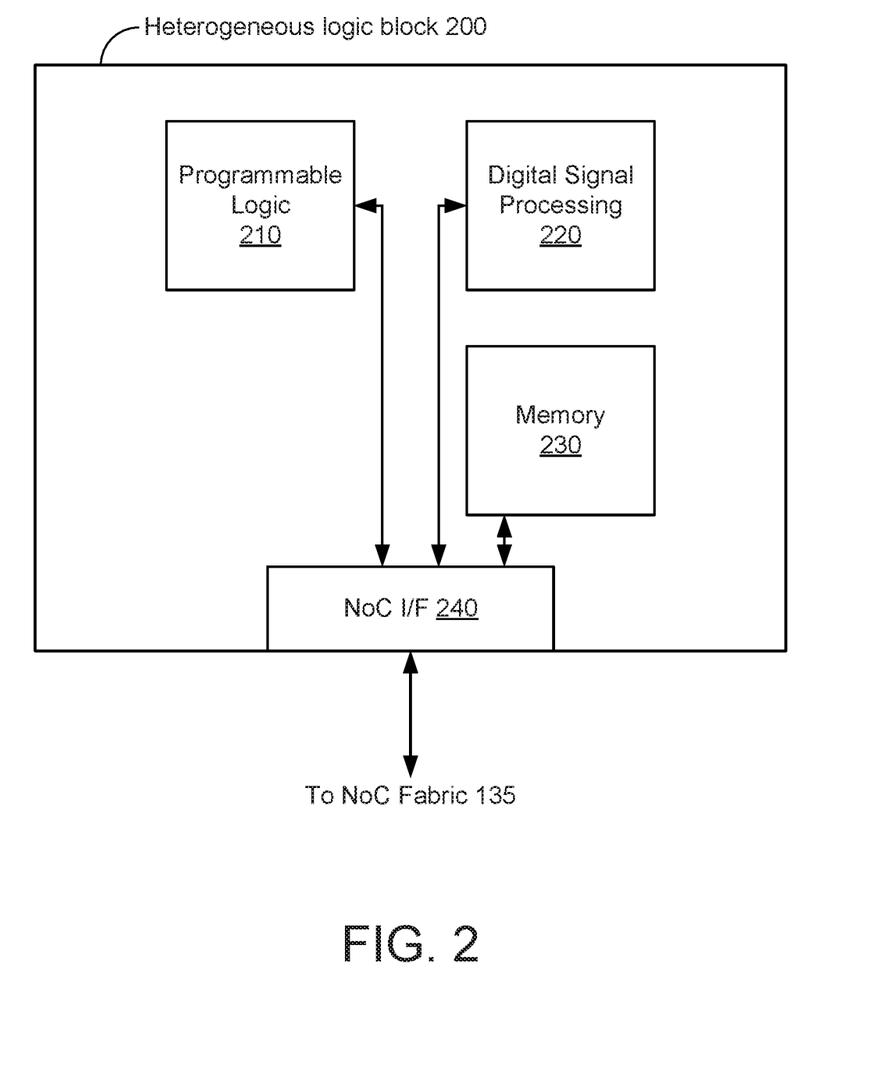
FIG. 2 is a block diagram of a heterogeneous logic block.

FIG. 2 is a block diagram of a heterogeneous logic block 200. The heterogeneous logic block 200 may be an example embodiment of any of the heterogeneous logic blocks 140-147 of FIG. 1. The heterogeneous logic block 200 may include programmable logic 210, a digital signal processing (DSP) block 220, memory 230, and a network-on-chip interface 240. In some implementations, the heterogeneous logic block 200 may include fewer logic blocks, more logic blocks, and/or different logic blocks (not shown for simplicity) than those depicted in the example of FIG. 2. Examples of different logic blocks may include, but are not limited to, Ethernet logic blocks, soft-decision forward error correction (SD-FEC) blocks, reference clock (RCLK) blocks, and other clocking circuits.

The programmable logic 210 may include one or more arrays of one or more logic elements that may be configured to perform a variety of functions. For example, the programmable logic 210 may be configured to implement Boolean functions, mathematical functions, state machines, or the like.

The DSP block 220 may include one or more configurable logic elements to implement a variety of digital signal processing functions. In some implementations, the DSP block 220 may include a scalar unit, a vector unit, a memory interface, a memory, and the like. The memory 230 may provide flexible and dynamic storage of data within the heterogeneous logic block 200. The memory 230 may include static RAM, dynamic RAM, register memory, or any other technically feasible data storage element. The NoC interface 240 may be coupled to the programmable logic 210, the DSP block 220, and the memory 230. In addition, the NoC interface 240 may be coupled to the NoC fabric 135 of FIG. 1. The NoC interface 240 may provide a packetized data communication interface to enable the heterogeneous logic block 200 to receive and transmit data through the NoC fabric 135. Thus, data may be transmitted and/or received between the programmable logic 210, the DSP block 220, and/or the memory 230 and any other component or logic block coupled to the NoC fabric 135.

As described above, the heterogeneous logic block 200 may be an example embodiment of any of the heterogeneous logic blocks 140-147. In some implementations, the heterogeneous logic blocks 140-147 may all be similar, identical, or near-identical to the heterogeneous logic block 200. Multiple similar, identical, or near-identical heterogeneous logic blocks may enable a user's design to be easily relocated and/or copied to other heterogeneous logic blocks. For example, the user's design may be implemented in a first heterogeneous logic block, such as heterogeneous logic block 141. Because the heterogeneous logic blocks 140-147 are substantially identical, the user's design in the heterogeneous logic block 141 may be copied or relocated to any of the other heterogeneous logic blocks 140 or 142-147, Notably, the NoC fabric 135 and the NoC interface 240 may further enable design relocation and reuse by providing a means for easily transferring data to and from the user's design, independent of the physical location of the heterogeneous logic blocks within the PLD 100. Further, the "regularity" of the similar, identical, or near-identical heterogeneous logic blocks 140-147 may enable a user's design to have similar maximum operating frequencies across different heterogeneous logic blocks.

Figure 3A:
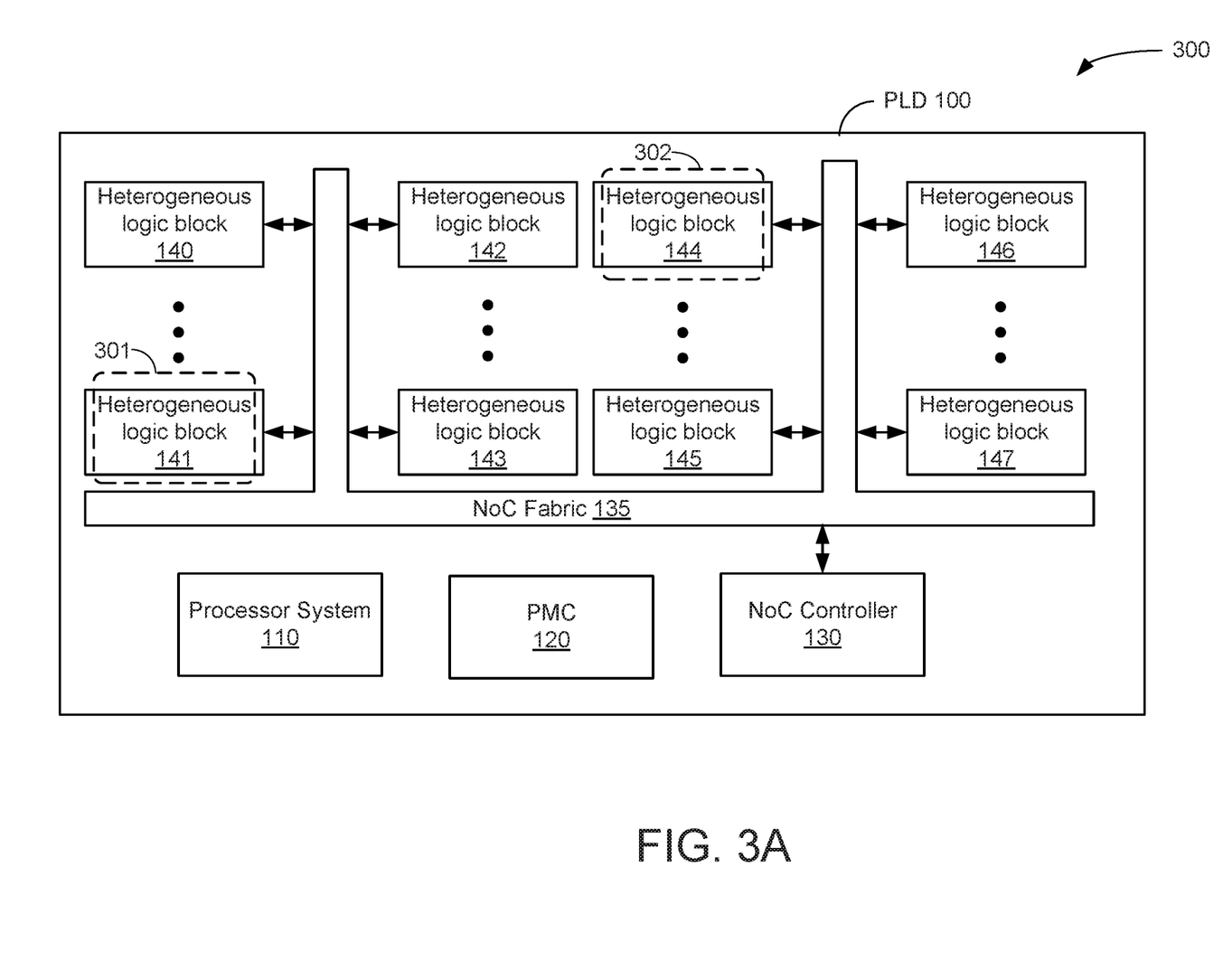
FIGS. 3A and 3B shows a block diagrams illustrating example operations of copying or moving a design core within a programmable logic device having a plurality of heterogeneous logic blocks.

FIG. 3A shows a block diagram 300 depicting an example operation for copying or moving a design core within a PLD having a plurality of heterogeneous logic blocks. For convenience, the PLD 100 of FIG. 1 is used to illustrate this procedure, however the procedure may be used with any PLD with a plurality of similar, identical, or near-identical heterogeneous logic blocks. A design core may be a portion of a user's design that implements a particular function or feature and may encompass several logic blocks, RAM elements, artificial intelligence (AI) engines, digital signal processors (DSPs), and the like. In addition, the design core may include routing, timing, and placement information associated with the implementation of the design within a heterogeneous logic block. Persons skilled in the art will recognize that routing and timing information in the context of PLD devices may refer to the routing and timing of signals within the PLD. Placement information may refer to the assignment and/or configuration of one or more operations to one or more logic blocks within the PLD. In the example of FIG. 3A, the heterogeneous logic block 141 may include a design core 301 specified by the user. The design core 301 (sometimes referred to as an intellectual property (IP) core) may implement a particular function and/or feature.

The design core 301 may be moved (e.g., relocated) or copied to form a design core 302 in the heterogeneous logic block 144, as shown in the example of FIG. 3A (the design cores 301 and 302 are shown with dashed lines). Notably, since the heterogeneous logic blocks 140-147 are similar, identical, or near-identical, the design core 301 may easily be moved or copied to other heterogeneous logic blocks. The work and effort expended by the user executing the software design tools to design the design core 301 does not need to be duplicated or repeated to implement the design core 302. Notably, the routing, timing, and placement information associated with the design core 301 may be used (and in some cases reused) to implement the design core 302. For example, the configuration data used to implement the design core 301 may be reused to configure and implement the design core 302 in the heterogeneous logic block 144.

As described above, a bitstream may include configuration data to configure all or part of the PLD 100. For example, a first bitstream may include configuration data to implement the design core 301 within heterogeneous logic block 141. Since each of the heterogeneous logic blocks 140-147 of the PLD 100 are similar, identical, or near-identical, the configuration data to implement the design core 301 within the heterogeneous logic block 141 may be similar, identical, or near-identical to the configuration data to implement the design core 302 within the heterogeneous logic block 144. Thus, a second bitstream may include the configuration data to implement the design core 301. However, the configuration data in the second bitstream may be "offset" to implement the design core 302 in the heterogeneous logic block 144 instead of the heterogeneous logic block 141. In some implementations, a bitstream may include an identifier to indicate the offset of the configuration data. In some implementations, the identifier may be a configuration data offset value that may indicate a location or position of the design core (described by the configuration data) within the PLD 100. In some other implementations, the configuration data offset value may indicate a location or position of the design core within the bitstream. By simply changing the configuration data offset value, the configuration data associated with the design core 301 may be moved from a first heterogeneous logic block to a second heterogeneous logic block.

Figure 3B:
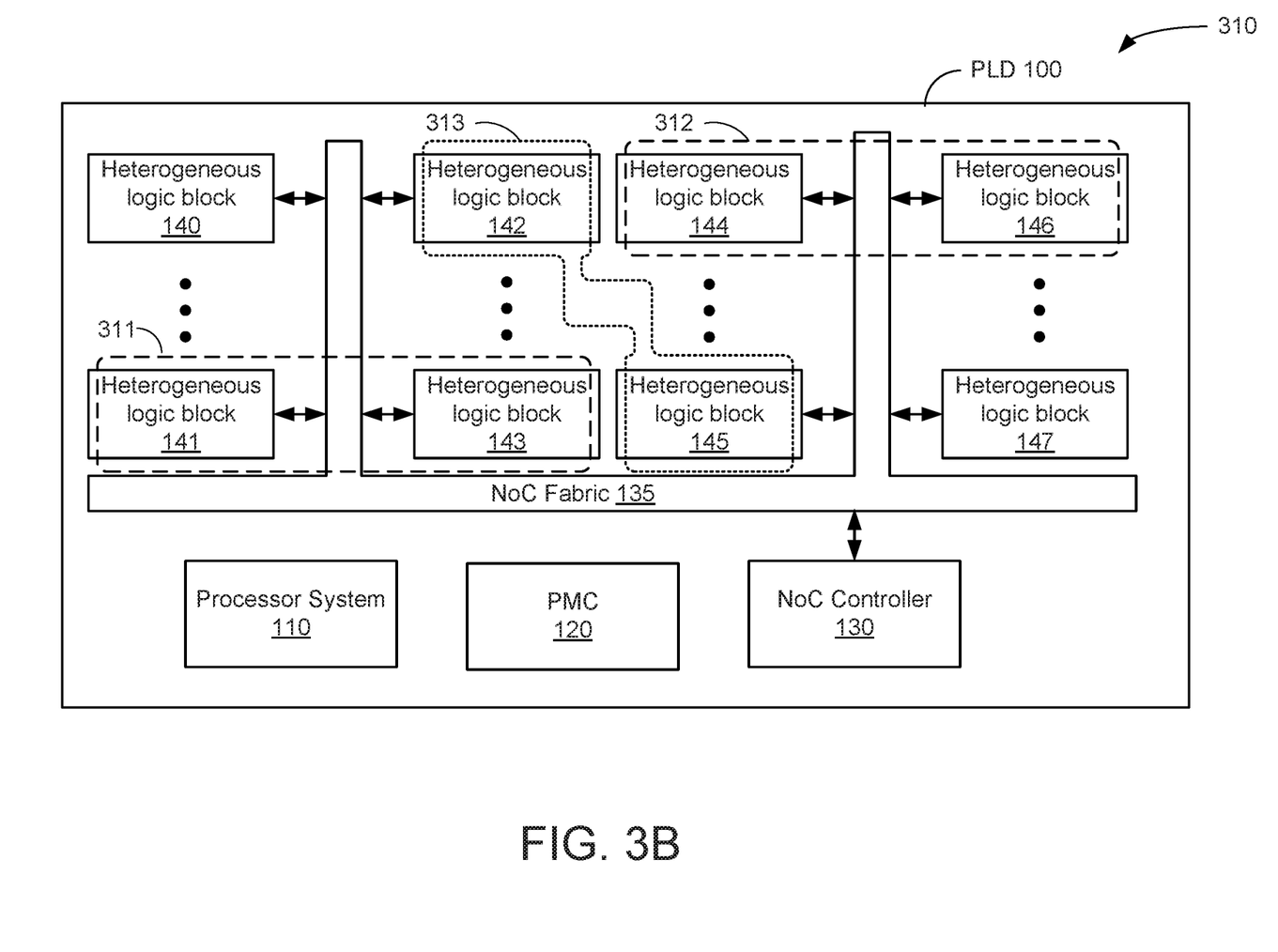

It is noted that, in some implementations, relocating a design core from one heterogeneous logic block to another heterogeneous logic block may involve rerouting some of the physical connections to the NOC fabric 135 (particularly when the design core is relocated between heterogeneous logic blocks on different sides the NOC fabric 135, such as shown in the example of FIG. 3A). With reference for example to FIG. 3A, the distance to the NOC fabric 135 may not be the same for each of the heterogeneous logic blocks 141 and 144. Thus, relocating the design core 301 to form the design core 302 may require incremental rerouting of some of the physical connections to the NOC fabric 135. As a result, the physical connections from the heterogeneous logic block 141 to the NOC fabric 135 may not be the same as the physical connections from the heterogeneous logic block 144 to the NOC fabric 135, FIG. 3B shows a block diagram 310 depicting another example operation for copying or moving a design core within a PLD having a plurality of heterogeneous logic blocks. In the example of FIG. 3B, a design core 311 is implemented using heterogeneous logic blocks 141 and 143.

In other words, the design core 311 may be implemented using (e.g., span) both the heterogeneous logic blocks 141 and 143. The design core 311 may be relocated or copied to form a design core 312 using heterogeneous logic blocks 144 and 146 (the design cores 311 and 312 are shown with dashed lines). In some implementations, since the design core 311 uses two heterogeneous logic blocks, the design core 312 may use any two heterogeneous logic blocks of the PLD 100. The flexible data routing provided by the NoC controller 130 and the NoC fabric 135 may enable flexibility regarding which heterogeneous logic blocks 140-147 may be used to implement the design core 312. For example, the design core 311 may be copied or relocated to form the design core 313 (shown with dotted lines) using heterogeneous logic blocks 142 and 145. In this example, the design core 311 may be a logical design core that may be split between any two similar, identical, or near-identical heterogeneous logic blocks, Thus, the design core 311 may not require any dedicated inter-block communications other than what may be provided through the NoC controller 130 and the NoC fabric 135, As illustrated in FIGS. 3A and 3B, a design core may be copied or relocated from a first group of one or more heterogeneous logic blocks to a second group of one or more heterogeneous logic blocks without changing the original configuration data. Other arrangements of design cores and heterogeneous logic blocks are possible and are not shown for simplicity. Although shown as copying or moving design cores within a PLD, design cores may be copied or moved from a first PLD to other PLDs, especially other PLDs with similar, identical, or nearly identical heterogeneous logic blocks such as those in the first PLD. In other implementations, the other PLDs may be stacked vertically and coupled together by silicon-based interconnections.

Figure 4:
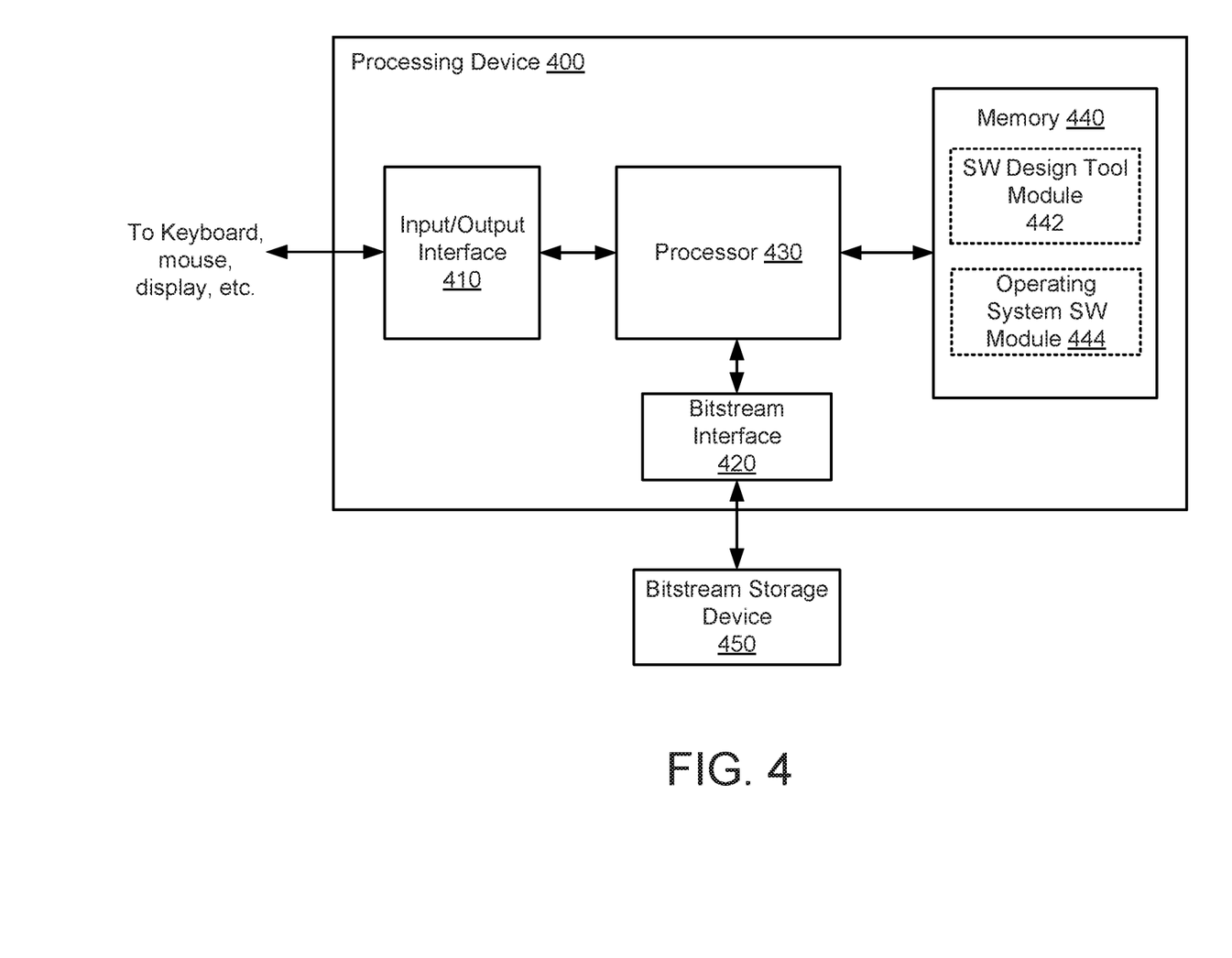
FIG. 4 shows a block diagram of an example processing device.

FIG. 4 shows a block diagram of an example processing device 400. The processing device 400 may receive user input and generate a bitstream to configure one or more PLDs. The processing device 400 may include an input/output interface 410, a bitstream interface 420, a processor 430 and a memory 440.

The input/output interface 410 may include hardware, software, and/or firmware to enable the user to provide data to and receive data from the processing device 400. For example, the input/output interface 410 may be coupled to one or more keyboards, mice, touchpads, or any other feasible devices to receive user input. The input/output interface 410 may also be coupled to one or more display devices to provide textual or graphic information to the user regarding the user's design and the design process. In some implementations, the input/output interface 410 may include a network interface. The network interface may enable user input and output data to be transferred via network, such as a wired or wireless network.

The bitstream interface 420 may enable a bitstream generated by a software design tool module (discussed in more detail below) to be delivered to a PLD. The bitstream interface 420 may be coupled to a bitstream storage device 450. In some implementations, the bitstream storage device 450 may be a memory device, such as flash memory, electrically erasable memory, or any other feasible memory device providing persistent data storage. The memory device may then be coupled to a PLD, (such as shown in FIG. 1), to allow the PLD to receive the bitstream. In another implementation, the bitstream storage device 450 may be a processing device similar to the processing device 400. In such an implementation, the bitstream storage device 450 may also receive and store the bitstream. The bitstream storage device 450 may then provide the bitstream to the PLD (e.g., through the PMC 120 of FIG. 1) to complete configuration of the PLD.

The memory 440 may include a non-transitory computer-readable storage medium (e.g., one or more nonvolatile memory elements, such as EPROM, EEPROM, Flash memory, a hard drive, etc.) that may store the following software modules:

a software (SW) design tool module 424 to capture a user's design for a programmable logic device; and an operating system SW module 444 to manage one or more operations of the processing device 400.

Each software module includes instructions that, when executed by the processor 430, cause the processing device 400 to perform the corresponding functions. The non-transitory computer-readable medium of the memory 440 thus includes instructions for performing all or a portion of the operations of FIG. 5.

The processor 430, which is coupled to the input/output interface 410, the bitstream interface 420, and the memory 440, may be any one or more suitable processors capable of executing scripts or instructions of one or more software programs stored in the processing device 400 (e.g., within the memory 440).

The processor 430 may execute the SW design tool module 442 to receive and capture the user's design for one or more PLDs and also to generate a bitstream to configure the PLDs to implement the user's design. The processor 430 may also execute the SW design tool module 442 to relocate or copy a design core from a first group of one or more heterogeneous logic blocks to a second group of one or more heterogeneous logic blocks. The first and second groups of one or more heterogeneous logic blocks may be within a single PLD, or within two or more separate PLDs.

The processor 430 may execute the operating system SW module 444 to manage one or more operations of the processing device 400. For example, the processor 430 may execute the operating system SW module 444 to receive and output user data through the input/output interface 410. The processor 430 may also execute the operating system SW module 444 to write out bitstreams generated by executing the SW design tool module 442. The bitstreams may be written out to the bitstream storage device 450.

Figure 5:
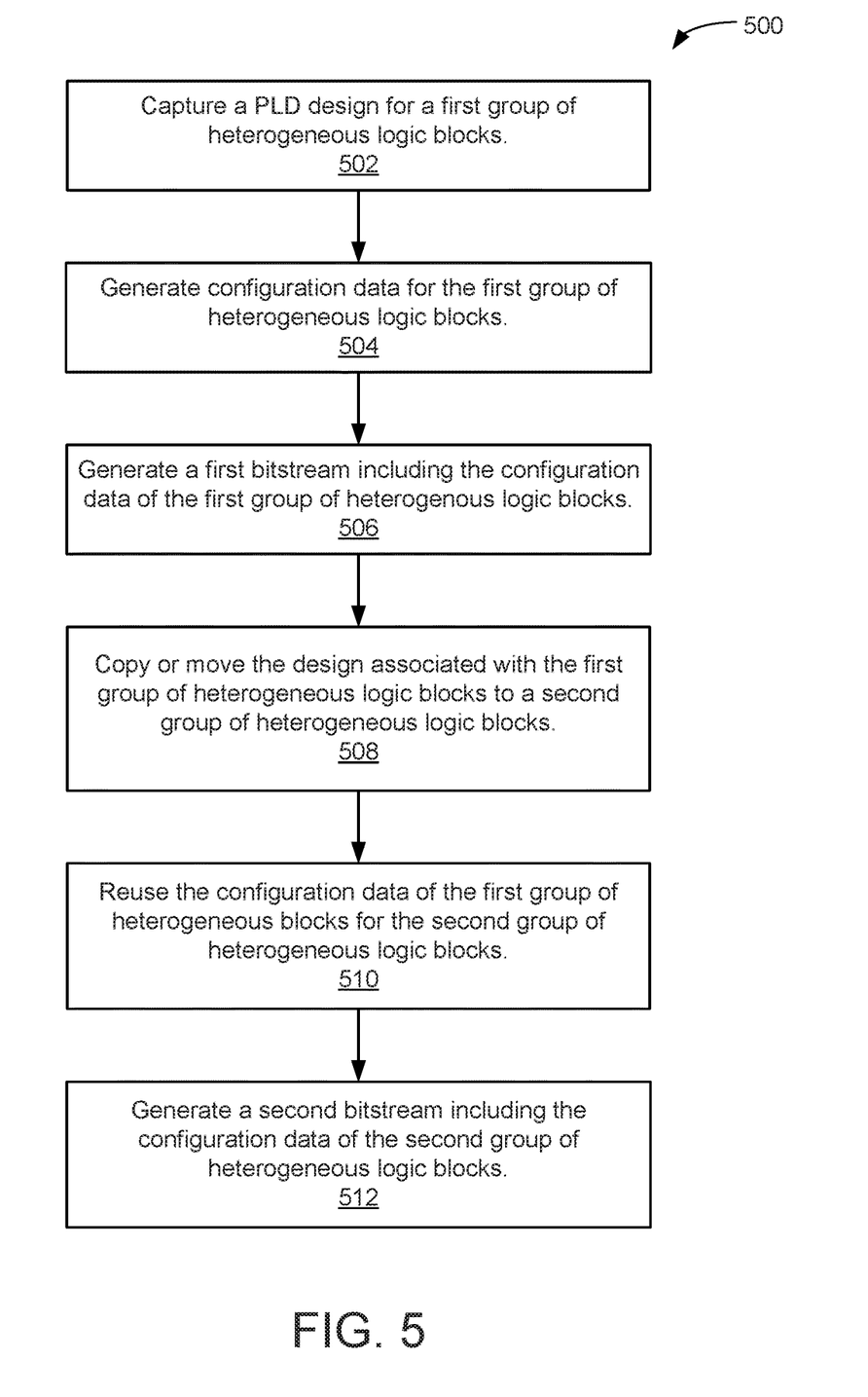
FIG. 5 shows an illustrative flow chart depicting an exemplary operation for generating bitstreams.

FIG. 5 shows an illustrative flow chart depicting an exemplary operation 500 for generating bitstreams. Although described herein as being performed by the processor 430 of FIG. 4, the operation 500 may be performed by any technically feasible processor, processing device, state machine, computer, server, or the like.

The processor 430 may capture a PLD design for a first group of heterogeneous logic blocks (502). In some implementations, the PLD design may target a PLD that includes a plurality of similar, identical, or nearly identical heterogeneous logic blocks such as the heterogeneous logic blocks 140-147 of the PLD 100. The processor 430 may execute the SW design tool module 442 to capture a user's design. Further, execution of the SW design tool module 442 may associate all or part of the user's design with a first group of one or more heterogeneous logic blocks. In some implementations, the user's design may include a design core that is implemented within the first group of heterogeneous blocks.

The processor 430 may generate configuration data for the first group of heterogeneous logic blocks (504). For example, the processor 430 may execute the SW design tool module 442 to process (e.g. compile and/or place and route)

and generate configuration data for the PLD design associated with the first group of heterogeneous logic blocks.

The processor 430 may generate a first bitstream including the configuration data associated with the first group of heterogeneous logic blocks (506). The first bitstream may include a configuration data offset value to associate the configuration data with the first group of heterogeneous logic blocks. The first bitstream may be used to configure one or more PLDs as described above with respect to FIG. 1.

The processor 430 may copy or move the design associated with the first group of heterogeneous logic blocks to a second group of heterogeneous logic blocks (508). For example, processor 430 may execute the SW design tool module 442 enabling the user to copy or move a design from the first group of heterogeneous logic blocks to a second group of one or more heterogeneous logic blocks. In some implementations, the design core included within the first group of heterogeneous logic blocks may be copied or moved to the second group of heterogeneous logic blocks.

The processor 430 may reuse the configuration data associated with the first group of heterogeneous logic blocks for the second group of heterogeneous logic blocks (510). The configuration data may be reused since the design implemented within the second group of heterogeneous logic blocks is based on (e.g., copied and/or moved from) the first group of heterogeneous logic blocks and since the heterogeneous logic blocks are similar, identical, or nearly-identical.

Next, the processor 430 may generate a second bitstream including the configuration data of the second group of heterogeneous logic blocks (512). In some implementations, the second bitstream may include the configuration data (determined in 510) and a configuration data offset value to associate the configuration data with the second group of heterogeneous logic blocks. The second bitstream may be used to configure one or more PLDs as described above with respect to FIG. 1.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example embodiments have been described with reference to specific example embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A device comprising:
a plurality of heterogeneous logic blocks, each of the heterogeneous logic blocks including a substantially identical configuration of programmable logic blocks; and
a platform management controller coupled to each of the heterogeneous logic blocks and configured to:
receive configuration data for a design core;
implement the design core in a first heterogeneous logic block of the plurality of heterogeneous logic blocks using the configuration data; and
implement the design core in a second heterogeneous logic block of the plurality of heterogeneous logic blocks using the configuration data.

2. The device of claim 1, wherein the first and the second heterogeneous logic blocks further comprise an on-chip, packetized data communication interface configured to transmit and receive data.

3. The device of claim 1, wherein the design core implemented in the second heterogeneous logic block reuses at least one of placement, routing, or timing information of the design core implemented in the first heterogeneous logic block.

4. The device of claim 1, wherein the configuration data comprises a first part to configure the first heterogeneous logic block and a second part to configure the second heterogeneous logic block.

5. The device of claim 4, wherein the second part of the configuration data relocates the design core from the first heterogeneous logic block to the second heterogeneous logic block.

6. The device of claim 4, wherein the first part of the configuration data comprises a first identifier to identify the first heterogeneous logic block and the second part of the configuration data comprises a second identifier to identify the second heterogeneous logic block.

7. The device of claim 1, wherein the design core spans two or more heterogeneous logic blocks of the plurality of heterogeneous logic blocks.

8. The device of claim 1, wherein each of the heterogeneous logic blocks includes an identical configuration of programmable logic blocks.

9. The device of claim 8, wherein the first and the second heterogeneous logic blocks further comprise an on-chip, packetized data communication interface configured to transmit and receive data.

10. The device of claim 8, wherein the design core implemented in the second heterogeneous logic block reuses at least one of placement, routing, or timing information of the design core implemented in the first heterogeneous logic block.

11. The device of claim 8, wherein the configuration data comprises a first part to configure the first heterogeneous logic block and a second part to configure the second heterogeneous logic block.

12. The device of claim 11, wherein the second part of the configuration data relocates the design core from the first heterogeneous logic block to the second heterogeneous logic block.

13. The device of claim 11, wherein the first part of the configuration data comprises a first identifier to identify the first heterogeneous logic block and the second part of the configuration data comprises a second identifier to identify the second heterogeneous logic block.

14. The device of claim 8, wherein the design core spans two or more heterogeneous logic blocks of the plurality of heterogeneous logic blocks.

15. A system comprising:
a processing device configured to generate first configuration data; and
a first programmable logic device comprising:
a plurality of heterogeneous logic blocks, each of the heterogeneous logic blocks including a substantially identical configuration of programmable logic blocks; and
a platform management controller coupled to each of the heterogeneous logic blocks and configured to:
receive first configuration data for a design core;
implement the design core in a first heterogeneous logic block of the plurality of heterogeneous logic blocks using the first configuration data; and
implement the design core in a second heterogeneous logic block of the plurality of heterogeneous logic blocks using the first configuration data.

16. The system of claim 15, wherein the first and the second heterogeneous logic blocks further comprise an on-chip, packetized data communication interface configured to transmit and receive data.

17. The system of claim 15, wherein the design core implemented in the second heterogeneous logic block reuses at least one of placement, routing, or timing information of the design core implemented in the first heterogeneous logic block.

18. The system of claim 15, wherein the first configuration data comprises a first part to configure the first heterogeneous logic block and a second part to configure the second heterogeneous logic block.

19. The system of claim 18, wherein the second part of the first configuration data relocates the design core from the first heterogeneous logic block to the second heterogeneous logic block.

20. The system of claim 18, wherein the first part of the first configuration data comprises a first identifier to identify the first heterogeneous logic block and the second part of the first configuration data comprises a second identifier to identify the second heterogeneous logic block.

21. The system of claim 15, wherein the design core spans two or more heterogeneous logic blocks of the plurality of heterogeneous logic blocks.

22. The system of claim 15, further comprising:
a second programmable logic device comprising:
a plurality of heterogeneous logic blocks identical to the heterogeneous logic blocks of the first programmable logic device; and
a second platform management controller coupled to each of the heterogeneous logic blocks of the second programmable logic device, the second platform management controller configured to implement the design core in a third heterogeneous logic block using second configuration data.

23. The system of claim 15, wherein each of the heterogeneous logic blocks includes an identical configuration of programmable logic blocks.

24. The system of claim 23, wherein the first and the second heterogeneous logic blocks further comprise an on-chip, packetized data communication interface configured to transmit and receive data.

25. The system of claim 23, wherein the design core implemented in the second heterogeneous logic block reuses at least one of placement, routing, or timing information of the design core implemented in the first heterogeneous logic block.

26. The system of claim 23, wherein the first configuration data comprises a first part to configure the first heterogeneous logic block and a second part to configure the second heterogeneous logic block.

27. The system of claim 26, wherein the second part of the first configuration data relocates the design core from the first heterogeneous logic block to the second heterogeneous logic block.

28. The system of claim 26, wherein the first part of the first configuration data comprises a first identifier to identify the first heterogeneous logic block and the second part of the first configuration data comprises a second identifier to identify the second heterogeneous logic block.

29. The system of claim 23, wherein the design core spans two or more heterogeneous logic blocks of the plurality of heterogeneous logic blocks.

30. The system of claim 23, further comprising:
a second programmable logic device comprising:
a plurality of heterogeneous logic blocks identical to the heterogeneous logic blocks of the first programmable logic device; and
a second platform management controller coupled to each of the heterogeneous logic blocks of the second programmable logic device, the second platform management controller configured to implement the design core in a third heterogeneous logic block using second configuration data.

31. A method comprising:
generating a first bitstream including first configuration data to implement a first design in a first heterogeneous logic block of a programmable logic device, wherein the first bitstream includes a first identifier to associate the first configuration data with the first heterogeneous logic block; and
generating a second bitstream including the first configuration data to implement the first design in a second heterogeneous logic block of the programmable logic device, wherein the second bitstream includes a second identifier to associate the first configuration data with the second heterogeneous logic block, wherein each of the first and the second heterogeneous logic blocks includes a substantially identical configuration of programmable logic blocks.

32. The method of claim 31, wherein each of the first and the second heterogeneous logic blocks includes an on-chip, packetized data communication interface.

33. The method of claim 31, wherein the first configuration data includes a design core to configure at least a portion of the first heterogeneous logic block and a portion of the second heterogeneous logic block to implement a function.

34. The method of claim 31, wherein the first bitstream is provided to a first programmable logic device and the second bitstream is provided to a second programmable logic device.

35. The method of claim 31, wherein each of the first and the second heterogeneous logic blocks includes an identical configuration of programmable logic blocks.

\* \* \* \* \*